US011087400B2

(12) United States Patent
Davies et al.

(10) Patent No.: US 11,087,400 B2
(45) Date of Patent: *Aug. 10, 2021

(54) SYSTEMS AND METHODS FOR DISPLAYING ORDER PERFORMANCE METRICS

(71) Applicant: FIDESSA TRADING UK LIMITED, London (GB)

(72) Inventors: Robert Davies, Essex (GB); Will Winzor-Saile, Norfolk (GB)

(73) Assignee: FIDESSA TRADING UK LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/722,883

(22) Filed: Dec. 20, 2019

(65) Prior Publication Data

US 2020/0126157 A1 Apr. 23, 2020

Related U.S. Application Data

(63) Continuation of application No. 14/743,113, filed on Jun. 18, 2015, now Pat. No. 10,552,903.

(60) Provisional application No. 62/015,065, filed on Jun. 20, 2014, provisional application No. 62/014,576, filed on Jun. 19, 2014.

(51) Int. Cl.
*G06Q 40/04* (2012.01)
(52) U.S. Cl.
CPC .................... *G06Q 40/04* (2013.01)
(58) Field of Classification Search
CPC .............................................. G06Q 40/04

USPC .......................................................... 705/37
See application file for complete search history.

(56) References Cited

U.S. PATENT DOCUMENTS

| 8,296,221 | B1 * | 10/2012 | Waelbroeck | ........... | G06Q 40/04 |
| | | | | | 705/37 |
| 8,301,548 | B1 * | 10/2012 | Waelbroeck | ........... | G06Q 40/04 |
| | | | | | 705/37 |
| 2002/0123947 | A1 * | 9/2002 | Yuste | ..................... | G06Q 40/02 |
| | | | | | 705/35 |
| 2005/0228735 | A1 * | 10/2005 | Duquette | ............... | G06Q 40/04 |
| | | | | | 705/37 |

(Continued)

OTHER PUBLICATIONS

Title: A High-Low Model of Daily Stock Price Ranges Authors: Yan-Leung Cheung, Yin-Wong Cheung, Alan T.K. Wan CESifo Working Paper No. 2387 (Year: 2008).*

(Continued)

*Primary Examiner* — Christopher Bridges
*Assistant Examiner* — Yongsik Park
(74) *Attorney, Agent, or Firm* — Baker Botts L.L.P.

(57) ABSTRACT

Systems and methods for generating a graphical representation for and displaying order performance metrics for one or more user orders of one or more market instruments. A graphical representation of the order performance metrics can be aligned with a graphical representation of market data relating to prices and volume of user orders, market orders, user order executions, and market trades. The order performance metrics can be displayed as one or more performance bars or ribbons divided into segments, which can be assigned a color based on a user order's performance with respect to a market benchmark. The graphical representations can be displayed using a display device.

20 Claims, 6 Drawing Sheets

(56) References Cited

U.S. PATENT DOCUMENTS

| | | | | |
|---|---|---|---|---|
| 2006/0259394 | A1* | 11/2006 | Cushing | G06Q 40/06 705/37 |
| 2007/0150407 | A1* | 6/2007 | Gilboy | G06Q 40/04 705/37 |
| 2007/0265954 | A1* | 11/2007 | Mather | G06F 3/0481 705/37 |
| 2008/0086401 | A1* | 4/2008 | Mather | G06Q 40/00 705/35 |
| 2009/0076981 | A1* | 3/2009 | Schonberg | G06Q 40/06 705/36 R |
| 2011/0270732 | A1* | 11/2011 | Ritter | G06Q 40/04 705/37 |
| 2012/0150713 | A1* | 6/2012 | Russel | G06Q 40/04 705/37 |
| 2015/0339771 | A1* | 11/2015 | Sylvester | G06Q 40/04 705/37 |

OTHER PUBLICATIONS

U.S. Appl. No. 14/743,113 (now U.S. Pat. No. 10,552,903), filed Jun. 18, 2015 (Feb. 4, 2020).

U.S. Appl. No. 14/743,113, Dec. 20, 2019 Issue Fee Payment.

U.S. Appl. No. 14/743,113, Dec. 11, 2019 Notice of Allowance.

U.S. Appl. No. 14/743,113, Sep. 23, 2019 Notice of Allowance.

U.S. Appl. No. 14/743,113, Aug. 7, 2019 Amendment and Request for Continued Examination (RCE).

U.S. Appl. No. 14/743,113, May 8, 2019 Final Office Action.

U.S. Appl. No. 14/743,113, Jan. 17, 2019 Response to Non-Final Office Action.

U.S. Appl. No. 14/743,113, Nov. 19, 2018 Non-Final Office Action.

U.S. Appl. No. 14/743,113, Aug. 14, 2018 Amendment and Request for Continued Examination (RCE).

U.S. Appl. No. 14/743,113, Apr. 19, 2018 Final Office Action.

U.S. Appl. No. 14/743,113, Jan. 29, 2018 Response to Non-Final Office Action.

U.S. Appl. No. 14/743,113, Oct. 26, 2017 Non-Final Office Action.

Cheung et al., "A High-Low Model of Daily Stock Price Ranges," CESifo Working Paper No. 2387 (2008).

\* cited by examiner

SYSTEMS AND METHODS FOR DISPLAYING ORDER PERFORMANCE METRICS

CROSS-REFERENCE TO RELATED APPLICATIONS

This application is a continuation of U.S. patent application Ser. No. 14/743,113, filed Jun. 18, 2015 and entitled "SYSTEMS AND METHODS FOR DISPLAYING ORDER PERFORMANCE METRICS," which is related to U.S. Provisional Application Ser. No. 62/014,576, filed Jun. 19, 2014, and U.S. Provisional Application Ser. No. 62/015,065, filed on Jun. 20, 2014, each of which is incorporated herein by reference in its entirety and from each of which priority is claimed.

BACKGROUND

The disclosed subject matter relates to techniques for displaying order performance metrics.

Traders engaged in the trading of market instruments can utilize various systems and graphical user interfaces to display market price data, execute orders and monitor status of different market conditions. Market instruments can include anything that can be traded in some quantity for a particular price. For example, a market instrument can be goods or financial products (e.g., stocks, bonds, futures, currency, commodities, or other financial instruments). Market instruments can be "real" and listed on an exchange or "synthetic," such as a combination of real products.

Electronic trading of market instruments has been embraced as the means for buying and selling instruments in various market exchanges throughout the world. Traders can communicate via personal computer or mobile device with host computers of the market exchanges or other intermediary host computers coupled with the exchanges. Electronic trading allows for display of information regarding market instruments received from the host computer which can impact the decision making process of the trader with regard to placing trade orders.

Types of information that can impact a trader's decision to trade an instrument include the market price for the instrument, the expected volume of the instrument on the market, the trader's limit price, and generally, the performance of pending or previously executed orders against benchmarks calculated from market data over a period of time. Such benchmarks can include, for example, the volume-weighted average price for the instrument and the expected volume for the instrument.

The ability to visualize these metrics over time through a graphical user interface can be useful both to traders and their clients in assessing the quality of their investments and informing future order decisions. Often, however, it is difficult to reconcile order history data, which can be provided in different chart forms such as graphs and tables. Additionally, order histories often only reflect either market data or order data. Thus, parties are unable to grasp a comprehensive understanding of how their order executions compare to trades in the market. Conventional graphical user interface displays of order executions leave gaps of understanding for which the trader must justify a particular performance to a client.

Accordingly, there is a need for improved techniques in displaying simultaneously comprehensive user order history data and market information over time.

SUMMARY

In one aspect of the disclosed subject matter, a system for displaying order performance metrics includes a computing device that includes one or more processors. The processors are configured to receive and aggregate market data for one or more market instruments. The market data includes information corresponding to one or more user orders, including user order execution information for the one or more user orders, information corresponding to market order information, and information corresponding to market trade information. The computing device is configured to calculate order performance metrics relating to performance of the user orders with respect to market benchmarks for each of a plurality of time sections within a selected time period. The plurality of time sections within each time period are divided based upon the occurrence of order events or changes in limit price of orders. The selected time period is also divided into a plurality of time buckets of differing or equal length. The computing device is configured to generate a graphical representation of the order performance metrics having a first portion, a second portion, and a third portion. The first portion of the graphical representation displays data relating to prices of the user orders, user order executions, market orders, and market trades within a selected time period. The second portion of the graphical representation displays data relating to volume of user orders filled and volume of market orders within a selected time period. The third portion of the graphical representation displays the order performance metrics relating to the performance of the user orders compared with market benchmarks for each of the plurality of time sections within the selected time period. The system also includes a display device that is coupled with the computing device to display the graphical representation of the order performance metrics in a manner corresponding to the graphical representation of the data relating to prices displayed by the first portion and the graphical representation of the data relating to volume displayed by the second portion, within the selected time period.

In certain embodiments of the disclosed subject matter, the third portion of the graphical representation can display the order performance metrics as one or more performance bars or ribbons extending along a horizontal axis. Each performance bar or ribbon can be divided into segments and each segment can correspond to one of the plurality of time sections.

In certain embodiments of the disclosed subject matter, the first portion of the graphical representation can be rendered as a first upper portion, the second portion of the graphical representation can be rendered as a second lower portion, and the third portion of the graphical representation can be rendered as a third portion disposed between the first and second portions.

In certain embodiments of the disclosed subject matter, the third portion of the graphical representation can be adapted to display each segment of the one or more performance bars or ribbons having a color selected from a color gradient, wherein the color of each segment can be selected based on a user order's relative performance in comparison to a market benchmark for the time section corresponding to each segment.

In certain embodiments of the disclosed subject matter, the third portion of the graphical representation can be adapted to display the one or more performance bars or ribbons as a first performance bar or ribbon and a second performance bar or ribbon. Each performance bar or ribbon can extend horizontally and can be aligned in comparison with the data displayed in the first portion and the second portion. The color selected from the color gradient for each segment of the first performance bar or ribbon can correspond to the difference between a market volume-weighted average price for each of the plurality of time sections and a volume-weighted average price of the user order executions for each of the plurality of time sections, the color selected from the color gradient for each segment of the second performance bar or ribbon can correspond to the difference between an arrival price for a user order and a volume-weighted average price of the executed orders that take place during the time section corresponding to each segment.

In certain embodiments of the disclosed subject matter, the computing device can be configured to calculate a color intensity ($C_i$) for the display of the color of each segment of the first performance bar or ribbon using the equation:

$$C_i = \frac{\Delta_i/L_i}{\max_i |\Delta_i/L_i|};$$

where $L_i$ is the length of the section in minutes and $\Delta_i$ is the sum of the weighting cost ($\Omega$) and the difference between the market volume-weighted average price for the time section, where $$\Omega = s \times (P - P_i) \times (\rho V_i - v_i); \text{ where } \rho = \frac{v}{V} = \frac{\sum_i v_i}{V_i},$$

s=1 if the order is a sell order and s=−1 if the order is a buy order,
$v_i$=the volume of the order traded within the time section,
$p_i$=the average price achieved for the order within the time section,
$V_i$=the volume traded on the market within the time section, and
$P_i$=the volume-weighted average price within the time section.

In certain embodiments of the disclosed subject matter, the computing device can be configured to calculate a color intensity ($C_i$) for the display of the color of each segment of the second performance bar or ribbon using the equation:

$$C_i = \frac{\Delta_i/L_i}{\max_i |\Delta_i/L_i|};$$

where $L_i$ is the length of the time section in minutes and $\Delta_i$ is the difference between the arrival price for the order and the volume-weighted average price of the order executions taking place within the time section.

In certain embodiments of the disclosed subject matter, the first portion of the graphical representation can display an execution price for each user order execution as data points plotted with respect to time along a horizontal axis. The first portion of the graphical representation can display a market price based on the market order information, displayed as a line plotted with respect to time along a horizontal axis. The first portion of the graphical representation can display a volume-weighted average price for each of the plurality of time buckets, displayed as a line plotted with respect to time along a horizontal axis, starting from a time at which the user order is placed and extending to a displayed end time. The first portion of the graphical representation can display a limit price for each user order, displayed as a line, plotted with respect to time along a horizontal axis. The first portion of the graphical representation can display a shaded area that is displayed in association with one or more time buckets in the event that market prices fall outside of the limit price of a user order or in the event that there is insufficient market volume available to fill a user order.

In certain embodiments of the disclosed subject matter, the second portion of the graphical representation can display a volume differential. The volume differential can be displayed as a bar chart oriented symmetrically with respect to a horizontally-extending zero-axis, with bars extending positively above the zero-axis to indicate when a market instrument has been allocated at a greater percentage than it would have been had the order been traded in accordance with the market within each of the plurality of time buckets. In displaying the volume differential, bars extending negatively below the zero-axis can indicate when a market instrument has been allocated at a lower percentage than it would have been had the order been traded in accordance with the market within each of the plurality of time buckets.

In certain embodiments of the disclosed subject matter, the second portion of the graphical representation can display a cumulative volume of executed user orders. The cumulative volume can be calculated as the sum of the volume of all executions against a user order prior to and during each of the plurality of time buckets and can be displayed as a line beginning from a first time that a user order execution occurs and continuing until a specified end time, that can be plotted with respect to time along a horizontal axis.

In certain embodiments of the disclosed subject matter, the second portion of the graphical representation can display a volume of all executions against a user order as a bar chart oriented with respect to a horizontally-extending zero-axis, with bars extending positively above the zero-axis for each of the plurality of time buckets.

In certain embodiments of the disclosed subject matter, the second portion of the graphical representation can display a volume of all market order executions as a bar chart oriented with respect to a horizontally-extending zero-axis, with bars extending positively above the zero-axis for each of the plurality of time buckets.

In certain embodiments of the disclosed subject matter, the second portion of the graphical representation can display a percent of volume. The percent of volume can be calculated as the sum of the volumes of user order executions as a percentage of market value and can be displayed as a bar chart oriented with respect to a horizontally-extending zero-axis, with bars extending positively above the zero-axis for each of the plurality of time buckets.

In another aspect of the disclosed subject matter, a method for displaying order performance metrics includes receiving and aggregating market data for one or more market instruments. The market data includes information corresponding to one or more user orders, including user order execution information for the one or more user orders, information corresponding to market order information, and information corresponding to market trade information. The method includes calculating order performance metrics relating to performance of the user orders with respect to market benchmarks for each of a plurality of time sections within a selected time period. The plurality of time sections within the time period are divided based upon the occurrence of order events or changes in limit price of orders. The selected time period is also divided into a plurality of time buckets of differing or equal length. The method includes generating a graphical representation of the order performance metrics having a first portion, a second portion, and a third portion. The method includes generating the first portion to display data relating to prices of the user orders, user order executions, market orders, and market trades within a selected time period. The method includes generating the second portion to display data relating to volume of user orders filled and volume of market orders within a selected time period. The method includes generating the third portion to display the order performance metrics relating to the performance of the user orders compared with market benchmarks for each of the plurality of time sections within the selected time period. The method further includes displaying the graphical representation of the order performance metrics corresponding to the graphical representation of the data relating to prices and the graphical representation of the data relating to volume within the selected time period.

In certain embodiments of the disclosed subject matter, generating the third portion of the graphical representation can include generating the order performance metrics as one or more performance bars or ribbons extending along a horizontal axis. Each performance bar or ribbon can be divided into segments, with each segment corresponding to one of the plurality of time sections.

In certain embodiments of the disclosed subject matter, generating the graphical representation can include generating the first portion of the graphical representation as a first upper portion, generating the second portion of the graphical representation as a second lower portion, and generating the third portion of the graphical representation as a third portion disposed between the first and second portions.

In certain embodiments of the disclosed subject matter, generating the third portion of the graphical representation can include generating each segment of the one or more performance bars or ribbons by selecting a color from a color gradient for each segment based on a user order's relative performance in comparison to a market benchmark for the time section corresponding to each segment.

In certain embodiments of the disclosed subject matter, the method can include generating the third portion of the graphical representation of the one or more performance bars or ribbons as a first performance bar or ribbon and a second performance bar or ribbon. Each performance bar or ribbon can extend horizontally in alignment with the data displayed in the first portion and the second portion and the color selected from the color gradient for each segment of the first performance bar or ribbon can correspond to the difference between a market volume-weighted average price for each of the plurality of time sections and a volume-weighted average price of the user order executions for each of the plurality of time sections. The color selected from the color gradient for each segment of the second performance bar or ribbon can correspond to the difference between an arrival price for a user order and a volume-weighted average price of the executed market orders that take place during the time section corresponding to each segment.

In certain embodiments of the disclosed subject matter, the method can include calculating a color intensity ($C_i$) for the display of the color of each segment of the first performance bar or ribbon using the equation:

$$C_i = \frac{\Delta_i/L_i}{\max_i |\Delta_i/L_i|};$$

where $L_i$ is the length of the section in minutes and $\Delta_i$ is the sum of the weighting cost ($\Omega$) and the difference between the market volume-weighted average price for the time section, where $$\Omega = s \times (P - P_i) \times (\rho V_i - v_i); \text{ where } \rho = \frac{v}{V} = \frac{\sum_i v_i}{V_i},$$

s=1 if the order is a sell order and s=−1 if the order is a buy order,
$v_i$=the volume of the order traded within the time section,
$p_i$=the average price achieved for the order within the time section,
$V_i$=the volume traded on the market within the time section, and
$P_i$=the volume-weighted average price within the time section.

In certain embodiments of the disclosed subject matter, the method can include calculating a color intensity ($C_i$) for the display of the color of each segment of the second performance bar or ribbon using the equation:

$$C_i = \frac{\Delta_i/L_i}{\max_i |\Delta_i/L_i|};$$

where $L_i$ is the length of the time section in minutes and $\Delta_i$ is the difference between the arrival price for the order and the volume-weighted average price of the trade order executions taking place within the time section.

In certain embodiments of the disclosed subject matter, generating the graphical representation of the first portion can include generating a graphical representation of an execution price for each user order execution as data points plotted with respect to time along a horizontal axis. Generating the graphical representation of the first portion can also include generating a graphical representation of a market price based on the market order information as a line, plotted with respect to time along a horizontal axis. Generating the graphical representation of the first portion can also include generating a graphical representation of a volume-weighted average price for each of the plurality of time buckets, displayed as a line, plotted with respect to time along a horizontal axis, starting from a time at which the user order is placed and extending to a displayed end time. Generating the graphical representation of the first portion can also include generating a graphical representation of a limit price for each user order as a line, plotted with respect to time along a horizontal axis. Generating the graphical representation of the first portion can also include generating a graphical representation of an indicator, which can be displayed as a shaded area associated with one or more time buckets, that can be displayed in the event that market prices fall outside of the limit price of a user order, or in the event that there is insufficient market volume available to fill a user order.

In certain embodiments of the disclosed subject matter, generating the graphical representation of the second portion can include generating the graphical representation of a volume differential. The volume differential can be displayed as a bar chart that can be oriented symmetrically with respect to a horizontally-extending zero-axis. The bar chart can have bars extending positively above the zero-axis to indicate when a market instrument has been allocated at a greater percentage than it would have been had the order been traded in accordance with the market within each of the plurality of time buckets and can have bars extending negatively below the zero-axis to indicate when a market instrument has been allocated at a lower percentage than it would have been had the order been traded in accordance with the market within each of the plurality of time buckets.

In certain embodiments of the disclosed subject matter, generating the graphical representation of the second portion can include generating the graphical representation of a cumulative volume of executed user orders, which can be calculated as the sum of the volume of all executions against a user order prior to and during each of the plurality of time buckets. The cumulative volume can be displayed as a line, beginning from a first time that a user order execution occurs and continuing until a specified end time and can be plotted with respect to time along a horizontal axis.

In certain embodiments of the disclosed subject matter, generating the graphical representation of the second portion can include generating the graphical representation of a volume of all executions against a user order. The volume of all executions against a user order can be displayed as a bar chart oriented with respect to a horizontally-extending zero-axis and can have bars extending positively above the zero-axis for each of the plurality of time buckets.

In certain embodiments of the disclosed subject matter, generating the graphical representation of the second portion can include generating the graphical representation of a volume of all market order executions, which can be displayed as a bar chart oriented with respect to a horizontally-extending zero-axis. The bar chart can have bars extending positively above the zero-axis for each of the plurality of time buckets.

In certain embodiments of the disclosed subject matter, generating the graphical representation of the second portion can include generating the graphical representation of a percent of volume, which can be calculated as the sum of the volumes of user order executions as a percentage of market value. The percent of volume can be displayed as a bar chart oriented with respect to a horizontally-extending zero-axis and can have bars extending positively above the zero-axis for each of the plurality of time buckets.

In another aspect of the disclosed subject matter, a non-transitory computer-readable medium contains computer-executable instructions for performing a method for displaying order performance metrics that include receiving and aggregating market data for one or more market instruments. The market data includes information corresponding to one or more user orders, including user order execution information for the one or more user orders, information corresponding to market order information, and information corresponding to market trade information. The method dictated by the computer-executable instructions also includes calculating order performance metrics relating to performance of the user orders with respect to market benchmarks for each of a plurality of time sections within a selected time period. The plurality of time sections are divided based upon the occurrence of order events or changes in limit price of orders. The selected time period is also divided into a plurality of time buckets of differing or equal length. The method dictated by the computer-executable instructions also includes generating a graphical representation of the order performance metrics that has a first portion, a second portion, and a third portion. The first portion of the graphical representation displays data relating to prices of the user orders, user order executions, market orders, and market trade orders within a selected time period. The second portion of the graphical representation displays data relating to volume of user orders filled and volume of market orders within a selected time period. The third portion of the graphical representation displays the order performance metrics relating to the performance of the user orders compared with market benchmarks for each of the plurality of time sections within the selected time period. The method dictated by the computer-executable instructions also includes displaying the graphical representation of the order performance metrics corresponding to the graphical representation of the data relating to prices and the graphical representation of the data relating to volume within the selected time period.

Figure 1:
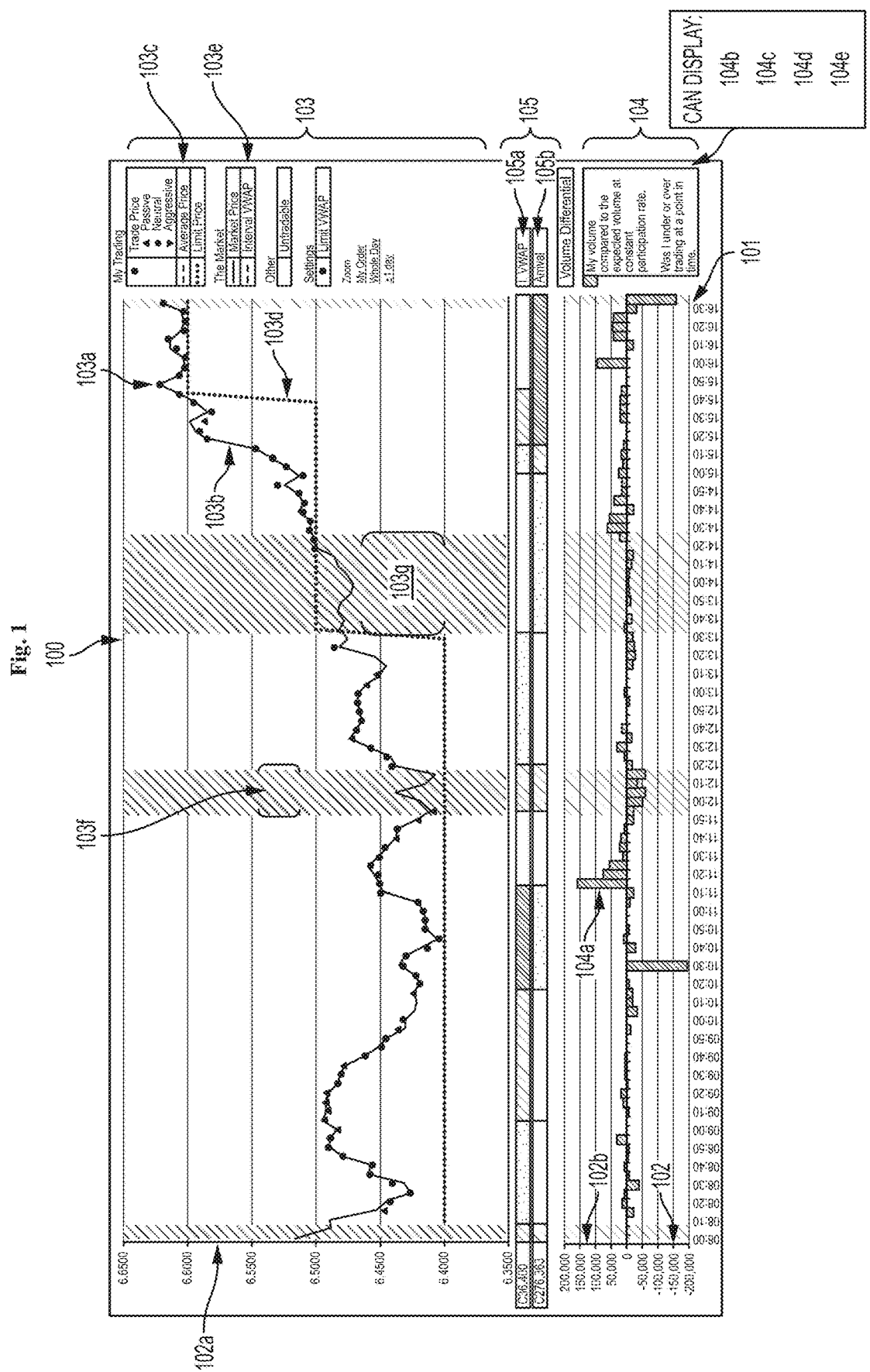
FIG. 1 illustrates a graphical user interface in accordance with an exemplary embodiment of the disclosed subject matter.

Throughout the drawings, the same reference numerals and characters, unless otherwise stated, are used to denote like features, elements, components or portions of the illustrated embodiments. Moreover, while the disclosed subject matter will now be described in detail with reference to the figures, it is done so in connection with the illustrative embodiments.

DETAILED DESCRIPTION

To measure past order performance and make future decisions, traders can utilize systems having graphical user interfaces which enable them to compare order history to market metrics conventionally displayed as charts graphed as some variable, such as price, versus time. Conventional display of such information, however, requires traders attempting to obtain a comprehensive analysis of order performance to compile and interpret various charts relating to different metrics. This process can be daunting, especially for those engaged in electronic trading who are not sophisticated traders. The disclosed subject matter provides techniques for analyzing the execution performance of user trade orders in connection with the trading of market instruments, and more particularly provides techniques for analyzing the execution performance of user trade orders against various benchmarks calculated from market information and through the display of various metrics on a graphical user interface. The disclosed subject matter can be embodied in the form of a system, method or non-transitory computer-readable medium containing computer-executable instructions for performing a method.

Certain exemplary and non-limiting embodiments of the disclosed subject matter will be described below with reference to the figures, for the purposes of illustration, and not limitation. It should be apparent, however, to those skilled in the art that many more modifications besides those described herein are possible without departing from the concepts of the disclosed subject matter. Additionally, it should be apparent to one of ordinary skill in the art that the techniques disclosed herein can be combined with other market display techniques.

In one aspect, the disclosed subject matter can include techniques for displaying order performance metrics and providing users with a graphical representation of the performance of their pending and executed orders over time. In certain embodiments, data related to prices of user order executions can be displayed along with data related to the price of market trades. The user order execution price data can further be displayed along with the limit price for each user order over a given time, which can thereby allow users to compare their execution prices with their limit prices. The former metrics, in addition to others, can be displayed together and in various combinations for analysis.

In another aspect of the disclosed subject matter, a graphical representation of data relating to the volume of executed user orders and the volume of market trades can be generated and displayed. In certain embodiments, the volume data of executed orders can be adapted to display the weight of the executed orders compared with a market benchmark, which can thereby allow users to determine whether their financial portfolios were overweight or underweight for a given time. Paired with the order execution and market price information, the volume data can allow users to visualize the extent of returns or losses for a given time.

Referring to FIG. 1, an in accordance with an exemplary and non-limiting embodiment, techniques for displaying order performance metrics can include computing techniques for generating a graphical user interface ("GUI"). The GUI can include a chart (100), referred to herein as a "stock chart" for purpose of clarity and not limitation, which can include a horizontal time axis partitioned into several "buckets" of time (101). Along the vertical axis (102) of the stock chart, the three portions of the stock chart, described above, can be provided such that a first portion (103), which can be embodied as a first upper portion, can be provided to display market price data overlaid with user order price data of a market instrument calculated for each time bucket and scaled to include all points. A second portion (104) of the stock chart, which can be embodied as a second lower portion, can be provided to display the volume differential between executed user orders filled and the expected volume of user orders that would have been filled if the user order had traded in-line with the market, where the volume data calculated for each time bucket can be scaled symmetrically around zero to include all points. A third portion (105) of the stock chart, which can be disposed between the first and second portions, can be provided to display the performance of the user order executions compared to market benchmarks by displaying order performance metrics that indicates the level of performance. The third portion can be split into sections, or segments (106) having a start time (106a) and an end time (106b).

In certain embodiments, the segments can be divided according to the occurrence of one of the following events, among others: amendment of total order volume, amendment of the limit price of orders, or fulfillment of a user order. For example, and not limitation, if a segment resulting from the occurrence of an event accounts for more than 10% of the lifetime of an order, then the section can be further divided equally into sections of less than 10% where time can be rounded to the nearest time bucket, or if a section is less than the time of a bucket, then the entire bucket can be used.

The time buckets along the horizontal axis (101) of the stock chart can represent different lengths of time such as, for example, ten minute intervals, as depicted in FIG. 1. The interval lengths can be set in a variety of different ways, for example, by user input or selection, automatically, based on the data displayed and/or user preferences, or otherwise, and can be set at equal or differing interval lengths. The data points related to both the user transaction and the market are calculated over the length of time for each time bucket. In some embodiments, the data points can be calculated over multiple days and can display details of a single or multiple user orders that match the instrument, can include orders of one or both transactional directions of buy or sell, and/or can include orders occurring in one or multiple currencies.

For the purposes of illustration, and not limitation, the vertical axis (102) can be partitioned to display price values (102a) corresponding to the data rendered in the first portion (103) of the stock chart (100), as depicted in FIG. 1. In certain embodiments, as described above, data that can be provided in the first portion (103) can include, for example, user order execution price data, market price data, average user order execution price, user order limit price, as well as other price-related indicators. One of skill in the art will appreciate that a variety of other price metrics can additionally or alternatively be displayed. For the purpose of explanation, and not limitation, a discussion of some possible price metrics follows.

As described herein, the first portion (103) can include user order execution price data points (103a) representing the buy or sell price of a user order, and market trade information (103b) for the given time bucket. The user order execution price data points (103a) can be designated on the GUI as "My Trade Price," and can be calculated as the volume-weighted average price ("VWAP") for the corresponding time bucket. In certain embodiments, the execution price data points (103a) can also indicate whether a corresponding trade took place passively, aggressively, or neutrally. For example, the transaction price data points (103a) can be displayed as colored or shaded markers that assume different shapes such as an upward-pointed triangle, a downward-pointed triangle, or a circle indicating whether the trades took place passively, aggressively, or neutrally, respectively, as depicted in FIG. 1.

The market trade information (103b) for the instrument can be designated on the GUI as "Market Price," and can reflect the price of the market trades. In certain embodiments, the market price information (103b) can be displayed as a thin, colored line, or any other line distinguishable from the graphical representations of other metrics, appearing continuously along the chart as depicted in FIG. 1, although one of skill in the art will appreciate that a variety of other suitable techniques can be used. For example, the market price can be displayed as a candlestick chart, a moving average, or other graphical representation.

As embodied herein, the first portion (103) can also include an average price (103c) of user orders that can be designated on the GUI as "My Average Price," and can be calculated as the volume-weighted average price for the time during which the user orders are executed. The average price (103c) can be displayed as a thick, dashed colored line, or any other line distinguishable from the graphical representations of other metrics, beginning from the first time bucket during which a user order execution takes place, which can be marked by the beginning of a segment (106a) and can extend to a displayed end time of the order, which can be marked by the end of a segment (106b).

In certain embodiments, the first portion (103) can also be adapted to display the limit price (103d) of one or more pending user orders as a function of time. The limit price (103d) can be designated on the GUI as "My Limit Price," and can be calculated as the price limit given by the user at the start of the time bucket or at the end of the time bucket if the order begins during a time bucket. The limit price (103d) can be displayed as a thick, dotted colored line, or any other type of line distinguishable from the other metrics displayed, beginning from the start time (106a) of the order to the end time (106b) of the order, and is stepped when an amendment to the limit price occurs.

In certain embodiments, the first portion (103) can also display the interval volume-weighted average price (103e), which represents the average price at which the instrument traded over the time buckets. The interval volume-weighted average price can be designated on the GUI as "Interval VWAP" and can be calculated as the volume-weighted average price of all market trades, or those that took place within the order limit, occurring between the start time of the order, which can be marked by the beginning of a segment (106a) and the end of the selected time section, which can be marked by the end of the segment (106b). The interval VWAP (103e) can be displayed as a thick, dashed, colored line, or any other line distinguishable from the other metrics displayed, appearing continuously from the start time (106a) of the order and the end time (106b) of the order.

In certain embodiments, the first portion (103) can also include an indicator associated with market prices falling outside of the user order limit, which can be designated on the GUI as "Untradeable Price." The untradeable price (103f) can be calculated as "true" for a user order to sell when the displayed market price (103b) is less than the limit price (103d) of the user order, and can be calculated as "true" for a user order to buy when the market price (103b) is greater than the limit price (103d) of the user order. If calculated as "true," the untradeable price (1030 can be displayed, for example, on the first portion (103) as a shading for the corresponding time buckets. The first portion can also display an indicator associated with zero or insufficient volume to fill a user order, which can be designated on the GUI as "Untradeable Volume." The untradeable volume (103g) can be calculated as "true" when the available market volume on the user order is zero or insufficient to fill the user order before the order has been entered, after the order has been executed, or if the order has been fully filled but later increased. If calculated as "true," the untradeable volume (103g) can be displayed, for example, as a shading corresponding to one or more time buckets, distinguishable from other indicators, such as the untradeable price (103f) on the first portion (103) of the stock chart (100).

For the purpose of illustration and not limitation, the vertical axis (102) can be further partitioned to display order volume data (102b) corresponding to the data featured in the second portion (104) of the stock chart (100). Any of the following can be displayed: the volume differential, the cumulative volume of executed user orders, volume of executed user orders during selected periods of time, market volume, or percent of volume. One of skill in the art will appreciate that a variety of other volume metrics can additionally or alternatively be displayed. For the purpose of explanation, and not limitation, a discussion of possible order volume metrics follows.

In certain embodiments, the volume differential (104a) can be designated on the GUI as "Volume Differential," which can be calculated for a selected period of time as the difference between the volume executed against a user order and the expected volume that would have been executed against a user order if the order had been traded in-line with the market, where the expected volume can be calculated as the market volume multiplied by the fraction of the total filled user order volume to the total market volume. A positive value of volume differential can denote that the trader was overweight during that time bucket, or in other words, that the market instrument was given too much representation and allocated at a percentage greater than a market benchmark. A negative value for volume differential can denote that the trader was underweight during that time bucket, or in other words, that the market instrument was given too little representation and allocated at a percentage less than a market benchmark. In one embodiment, the volume differential (104a) can be displayed in the second portion (104) as a bar chart with one bar per time bucket, oriented symmetrically around zero, as depicted in FIG. 1.

In certain embodiments, the cumulative volume (104b) of executed user orders can be designated on the GUI as "Cumulative Volume," and can be calculated as the sum of the volume of all executions against a user order prior to and during a given time bucket where the ordered volume (104c) can be determined by the volume ordered at the end of a time bucket. In certain embodiments, the ordered volume (104c) can be displayed as a thick, dotted, purple line beginning from a start time (106a) to a selected end time (106b), and which can be stepped where an amendment to the ordered volume occurs. The cumulative volume (104b) can be displayed in the second portion (104) as a thin, solid, purple line beginning from the first time a user order execution occurs to a selected end time. The cumulative volume can be displayed in a number of other colors and can use a number of graphical representations other than a line.

In certain embodiments, the volume of a trader's executed user orders (104c) during time buckets can be designated on the GUI as "My Volume," and can be calculated as the sum of the volume executed against a user order during a particular time bucket. In one embodiment, the volume of executed user orders (104c) during time buckets can be displayed in the second portion (104) as a green bar chart having one bar for each time bucket. The volume of executed orders can be displayed in a number of other colors and can use a number of graphical representations other than a bar chart.

In certain embodiments, the market volume (104d) can be designated on the GUI as "Market Volume," and can be calculated as the sum of the volume of all order executions on the market during a particular time bucket. The market volume (104d) can be displayed in the second portion (104) as a purple bar chart having one bar for each time bucket. The market volume can be displayed in a number of other colors and can use a number of graphical representations other than a bar chart.

In certain embodiments, the percent of volume (104e) can be designated on the GUI as "Percent of Volume," and can be calculated as the sum of the volumes of the executions as a percentage of the market volume (104d) for a particular time bucket. In one embodiment, the percent of volume (104d) can be displayed as an orange bar chart having one bar for each time bucket. The percent of volume can be displayed in a number of other colors and can use a number of graphical representations other than a bar chart.

For the purpose of illustration and not limitation, the third portion (105) can be disposed between the first and second portions of the stock chart (100), and for purpose of example in FIG. 1, can display the performance of the market according to certain benchmarks on a horizontal bar or ribbon (105a), which can be displayed as a top horizontal bar or ribbon, and can display the performance of a trader's user order execution history on a horizontal bar or ribbon (105b), which can be displayed as a bottom horizontal bar or ribbon, as depicted in FIG. 1. Both ribbons can be divided into segments (106) corresponding to time sections along the horizontal axis, having start times (106a) indicating when the segment starts, shown to the nearest second, and end times (106b) indicating when the segment ends, which can match the start time of the following section, as described above. For the purpose of explanation, and not limitation, a discussion of some possible performance benchmarks follows.

In certain embodiments, the market performance ribbon (105a) can be designated on the GUI as "Interval (or 'I.') VWAP," which can be calculated as the market volume-weighted average price between the start time (106a) and the end time (106b) of a section. In certain embodiments, performance can be indicated as a gradient-color or shaded bar. The color or shade of sections along the I. VWAP, or market performance, ribbon (105a) can be determined according to the difference between the Internal VWAP for the section and the volume-weighted average price of the executions taking place within that section in a monetary amount. The execution performance ribbon (105b) can be designated on the GUI as "Arrival," which can be calculated as the arrival price for the filled user order. The color or shade of the order sections along the Arrival, or execution, performance ribbon (105b) can be determined according to the difference between the arrival price for the user order and the average price for the section, where the average price for the section can be calculated as the volume-weighted average price of the executed orders that take place within the sections.

Figure 2:
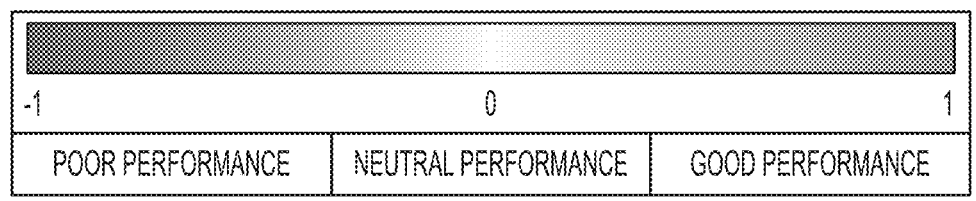
FIG. 2 illustrates a color gradient for indicating performance against a benchmark in accordance with an exemplary embodiment of the disclosed subject matter.

The distribution of the color or shade in the sections of both the Interval VWAP, or market performance, ribbon (105a) and the Arrival, or execution, performance ribbon (105b) can be based on the "Cost Per Minute" where the color or shading gradient can be symmetrical around white for each benchmark, as depicted in FIG. 2. For a time section in which an order did not or could not execute, the GUI can display a gray color for the associated segment, or distinguish the display of that segment in some other way.

In certain embodiments, for purpose of illustration and not limitation, the following equations can be used to determine the color intensity for display of performance of a given section:

$$\text{Cost Per Minute} = C_i = \frac{\Delta_i / L_i}{\max_i |\Delta_i / L_i|} \quad (1)$$

where $\Delta_i$ is the either the Total Cost for the Interval VWAP performance ribbon (105a), or the difference between the arrival price for the order and the volume-weighted average price of the executions taking place within the section for the Arrival performance ribbon (105b); and where $\Delta_i$ is the length of section i in minutes. Total Cost is equal to the sum of the difference between the Interval VWAP (which is the market VWAP between the start and end times of the time section) and the "Weighing Cost", where: Weighing Cost is equal to the contribution that the volume profile for the section makes to the overall VWAP performance, which is given by:

$$\Omega = s \times (P - P_i) \times (\rho V_i - v_i) \quad (2)$$

$$\text{Participation Rate } \rho = \frac{v}{V} = \frac{\sum_i v_i}{\sum_i V_i}, \quad (3)$$

where:
s=Sign of the order (1 for a sell, −1 for a buy),
$v_i$=Volume of the order traded within section i,
$p_i$=Average price achieved for the order within section i,
$V_i$=Volume traded on the market within section i,
and $P_i$=VWAP within section i.

In certain embodiments, the one or more processors of the computing device implementing the GUI can be configured to accept and aggregate data collected from the market as well as the transaction data associated with the user, and can further calculate the data points to be rendered in the three portions of the stock chart (100), as described above. The computing device can also be configured to receive user input from a user input device, such as a mouse.

Figure 6:
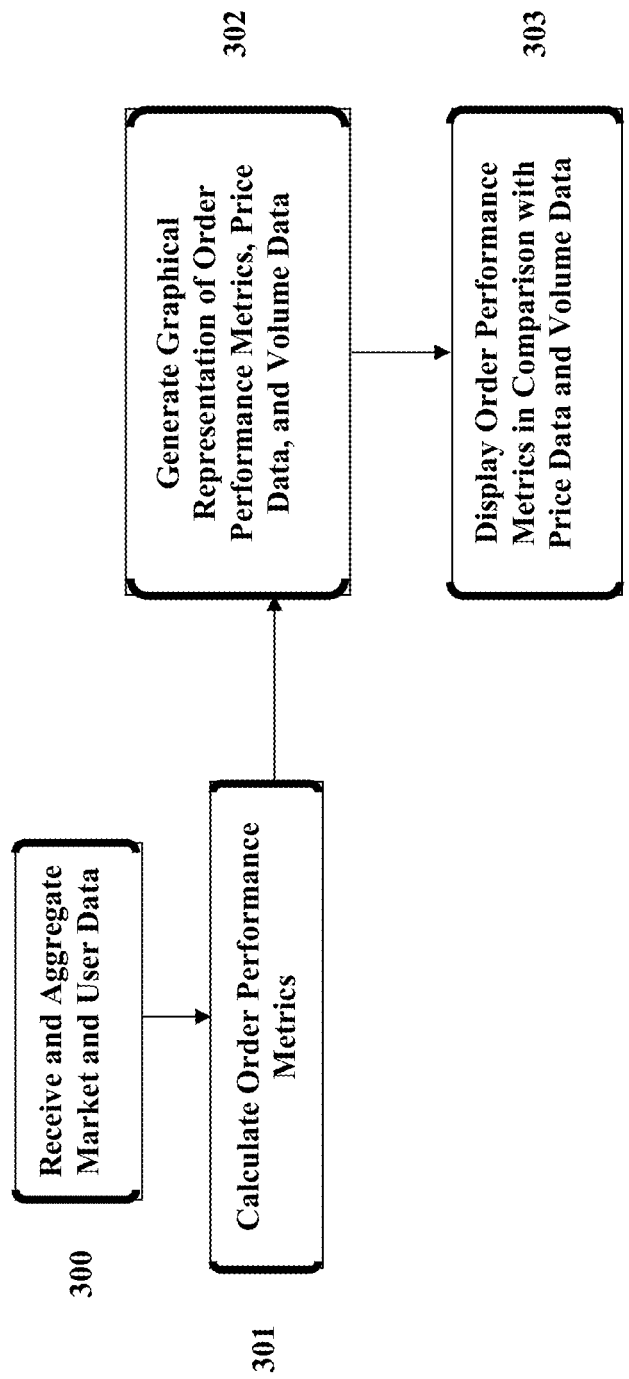
FIG. 6 illustrates a series of steps for displaying order performance metrics in accordance with an exemplary embodiment of the disclosed subject matter.

For purpose of illustration and not limitation, with reference to FIG. 6, a method for displaying order performance metrics in accordance with the disclosed subject matter can include a step of receiving and aggregating market data and user data, (300). The method can further include calculating order performance metrics (301) with respect to market benchmarks for each of a plurality of time sections within a selected time period based on the collected user data and market data. The method can further include generating a graphical representation of the order performance metrics (302) including a first portion, a second portion, and a third portion that can display data related to price, data related to volume, and the calculated order performance metrics, respectively. The method can further include displaying the order performance metrics (303) in comparison with the price data that can be displayed in the first portion of the graphical representation and the volume data that can be displayed in the second portion of the graphical representation.

Figure 5:
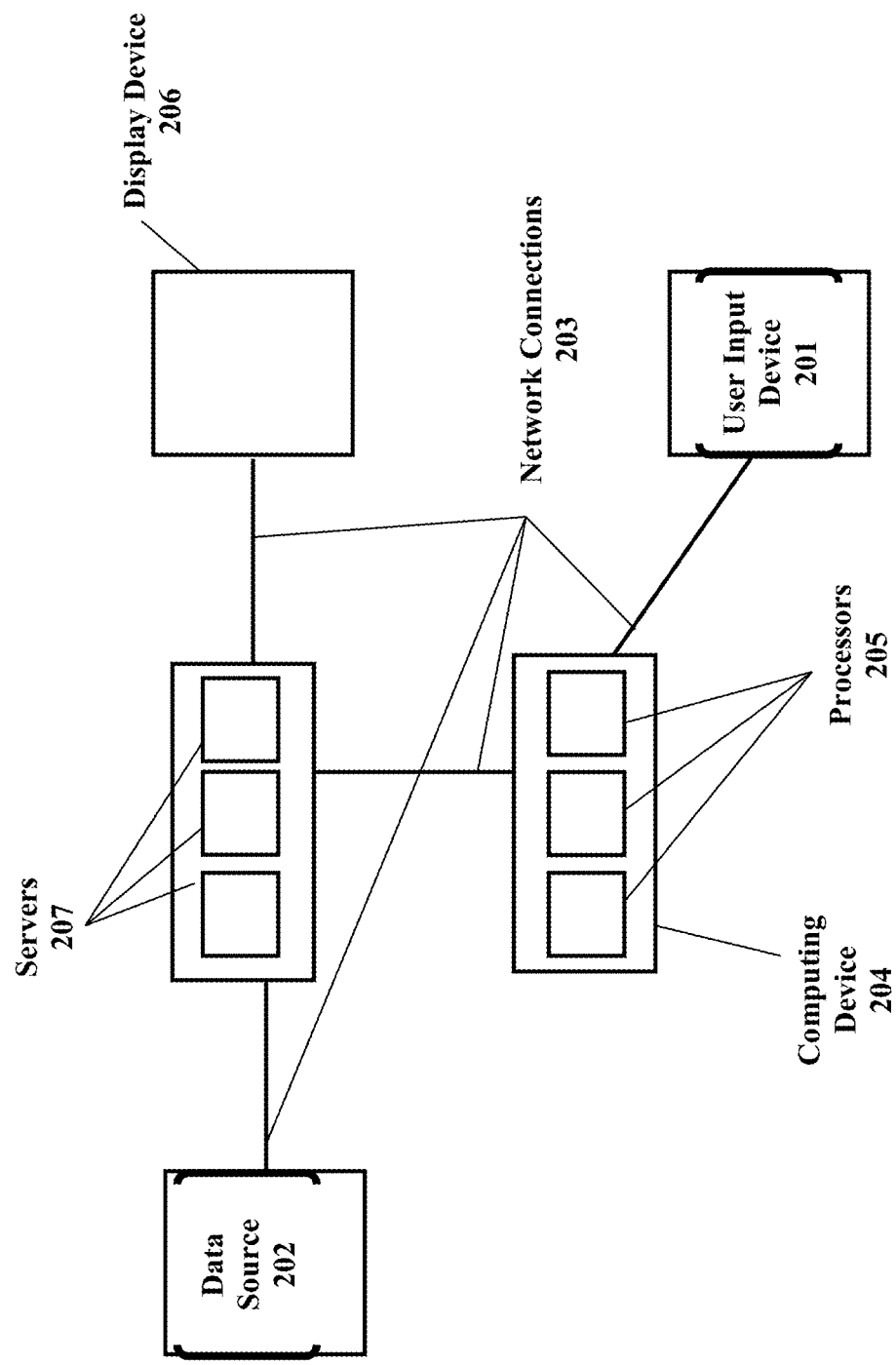
FIG. 5 illustrates a system for implementing a graphical user interface to display order performance metrics in accordance with an exemplary embodiment of the disclosed subject matter.

In certain embodiments, the GUI can be implemented, as shown in FIG. 5, using appropriate software, on a computing device (204) containing one or more processors (205) in communication with a user input device (201), such as a mouse or touchscreen. The computing device can also be connected to a data source (202) from which it can receive market data related to market orders, market trades, user orders and user order executions, as shown in FIG. 5 for example. The computing device can also be connected to a network as well as a display device (206) for providing the GUI to the user. The computing device can be a personal computer, laptop, handheld computing device, mobile device, smartphone, or any other computing device which allows for implementing the disclosed subject matter, and it can interact with servers (207) through a number of network connections (203), as shown in FIG. 5 for example. The computing device can interact with servers to receive and transmit data and to communicate with the display device (206) through the network connections (203) shown in FIG. 5, which can be embodied, for example, as fiber, other wire line network, wireless network, and can utilize, for example, cloud computing techniques or other known computing techniques.

Figure 3:
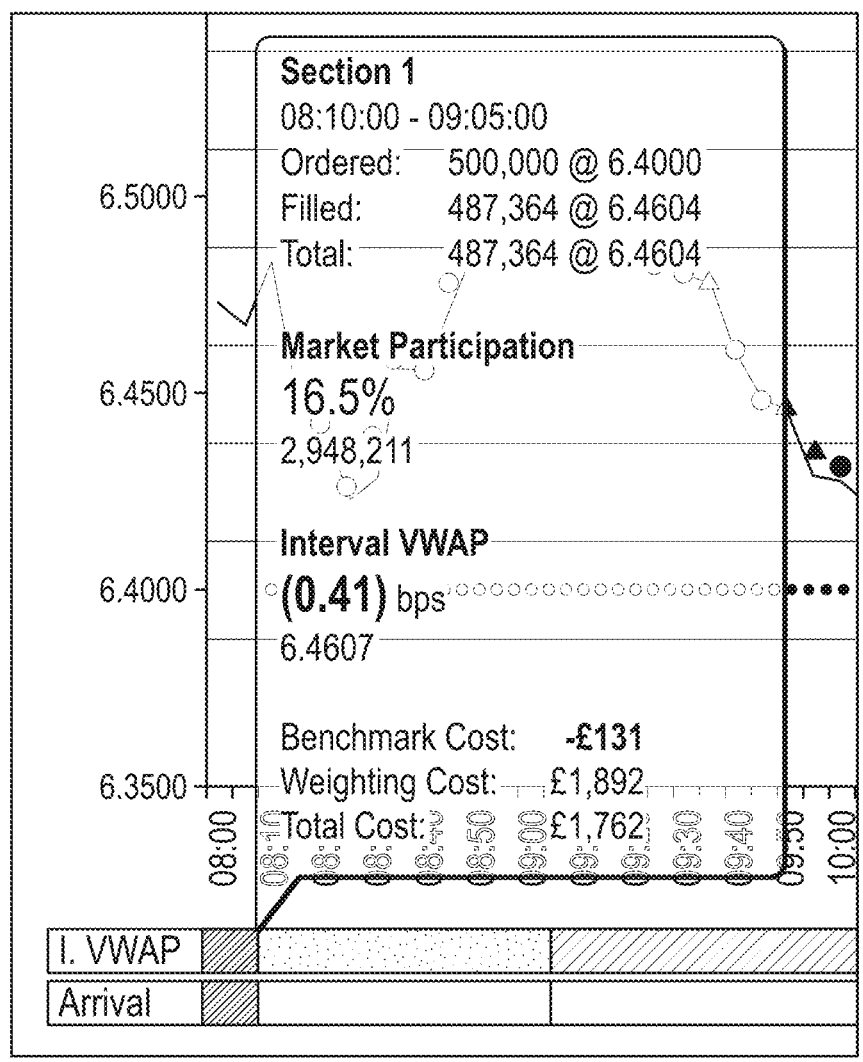
FIG. 3 illustrates the display of order performance information for a selected time interval in accordance with an exemplary embodiment of the disclosed subject matter.
Figure 4:
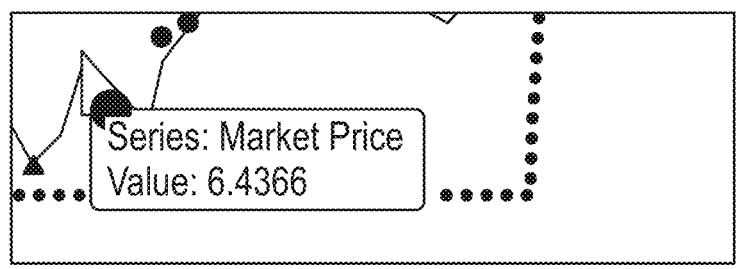
FIG. 4 illustrates the display of market information at a selected point on a graphical user interface in accordance with an exemplary embodiment of the disclosed subject matter.

Referring to FIG. 3 and FIG. 4, another aspect of the presently disclosed embodiment includes displaying, on the GUI additional data relating to points of time on the stock chart (100). For example, in certain embodiments, additional data relating to points of time of the stock chart can be displayed as a user navigates and hovers over those points with a mouse cursor. The additional data that can be displayed in an expanded window, cell, or some other GUI feature includes but is not limited to the price, volume of user orders ordered at that time bucket, volume of user orders filled at that time bucket, market participation, and Interval VWAP.

In certain embodiments, the disclosed subject matter can include a zoom feature allowing the user to control the length of time displayed on the horizontal time axis (101) where all three portions (103, 104, and 105) are scaled over that period. Similar zoom and scaling features can be provided for other axes or displayed data as well.

The disclosed subject matter can be used both while an order for a market instrument is being worked as well as after execution of the order for the purpose of understanding why an order achieved a particular performance against a benchmark. The disclosed subject matter can also allow traders to understand why poor performance occurred so that corrective action can be taken in the future, and can provide insight into the underlying market behavior to enable traders to explain and account for order execution performance (e.g., to allow a trader to explain and account for execution performance to investors), and demonstrate a high-level of expertise and sophistication so that traders can better market execution services to clients.

The presently disclosed subject matter is not to be limited in scope by the specific embodiments herein. Indeed, various modifications of the disclosed subject matter in addition to those described herein will become apparent to those skilled in the art from the foregoing description and the accompanying figures. Such modifications are intended to fall within the scope of the appended claims.

The invention claimed is:

1. A system for displaying order metrics, comprising:
a computing device including one or more processors, configured to:
receive and aggregate market data for one or more market instruments, including information corresponding to one or more user orders;
calculate order metrics relating to the one or more user orders with respect to market benchmarks for each of a plurality of time sections; and
generate a graphical representation of the order metrics;
a display device having one or more displayable portions coupled with the computing device, the one or more displayable portions adapted to display the graphical representation of the order metrics, wherein at least one of the one or more displayable portions of the display device is adapted to display each of the order metrics as one or more bars or ribbons, wherein each of the one or more bars or ribbons extends horizontally within its respective one or more displayable portion; and
wherein the computing device is configured to calculate a color intensity ($C_i$) for the display of a color of each segment of each bar or ribbon using the equation:

$$C_i = \frac{\Delta_i/L_i}{\max_i |\Delta_i/L_i|}$$

where $L_i$ is a length of the time section in minutes and $\Delta i$ is a sum of a weighting cost ($\Omega$) and a difference between a market volume-weighted average price for the time section, where $$\Omega = s \times (P - P_i) \times (\rho V_i - v_i); \text{ where } \rho = \frac{v}{V} = \frac{\sum_i v_i}{V_i},$$

s=1 if the order is a sell order and s=−1 if the order is a buy order,
$v_i$=the volume of the order traded within the time section,
$p_i$=the average price achieved for the order within the time section,
$V_i$=the volume traded on the market within the time section, and
$P_i$=the volume-weighted average price within the time section.

2. The system of claim 1, wherein the information corresponding to the one or more user orders includes at least one of user order execution information for the one or more user orders, information corresponding to market order information, and information corresponding to market trade information.

3. The system of claim 1, wherein the plurality of time sections is divided based upon order events or changes in a limit price of the orders.

4. The system of claim 3, wherein corresponding data points in each of the one or more displayable portions are each displayed corresponding to a time bucket in a plurality of time buckets.

5. The system of claim 1, wherein the one or more displayable portions includes a first displayable portion, a second displayable portion, and a third displayable portion, wherein the first displayable portion is adapted to display first data relating to at least one of prices of the user orders, user order executions, market orders, and market trades within a first selected time period, wherein the second displayable portion is adapted to display second data relating to at least one of a volume of user orders filled and a volume of user orders within a second selected time period, and wherein the third displayable portion is adapted to display third data relating to the order metrics relating to a performance of the user orders compared with market benchmarks for each of the plurality of time sections within a third selected time period.

6. The system of claim 5, wherein the third displayable portion is further adapted to display each of the order metrics as one or more bars or ribbons extending along a horizontal axis, each bar or ribbon being divided into segments, each segment corresponding to at least one of the plurality of time sections, and each segment having a color selected from a color gradient based on a user order's relative performance in comparison to a market benchmark for the time section corresponding to each segment and a color intensity ($C_i$)

related to the length of the time section and a market value weighted average price for the time section.

7. The system of claim 6, wherein the color selected from the color gradient for each segment of the bar or ribbon corresponds to one of the difference between a market volume-weighted average price for each of the plurality of time sections and a volume-weighted average price of the user order executions for each of the plurality of time sections or the difference between an arrival price for a user order and a volume-weighted average price of the executed orders that take place during the time section corresponding to each segment.

8. The system of claim 5, wherein the first displayable portion of the display device renders an upper portion, the second displayable portion of the display device renders a lower portion, and the third displayable portion of the display device renders a third portion disposed between the first and second portions.

9. The system of claim 1, wherein at least one of the one or more displayable portions of the display device is adapted to display at least one of:
an execution price for each user order execution, displayed as data points plotted with respect to time along a horizontal axis;
a market price based on the market order information, displayed as a line plotted with respect to time along a horizontal axis;
a volume-weighted average price, displayed as a line plotted with respect to time along a horizontal axis, starting from a time at which the user order is placed and extending to a displayed end time;
a limit price for each user order, displayed as a line, plotted with respect to time along a horizontal axis; or
a shaded area that is displayed in the event that market prices fall outside of the limit price of a user order or in the event that there is insufficient market volume available to fill a user order.

10. The system of claim 1, wherein at least one of the one or more displayable portions of the display device is adapted to display at least one of:
a volume differential, displayed as a bar chart;
a cumulative volume of executed user orders, plotted with respect to time along a horizontal axis;
a volume of all executions against a user order, displayed as a bar chart;
a volume of all market order executions, displayed as a bar; or
a percent of volume, displayed as a bar chart.

11. A method for displaying order metrics comprising:
receiving and aggregating market data for one or more market instruments, including information corresponding to one or more user orders;
calculating order metrics relating to the one or more user orders with respect to market benchmarks for each of a plurality of time sections; and
generating a graphical representation of the order metrics;
displaying, in one of one or more displayable portions of a display device, the graphical representation of the order metrics as one or more bars or ribbons, each of the one or more bars or ribbons extending horizontally within the respective one or more displayable portions;
calculating a color intensity ($C_i$) for the display of a color of each segment of each bar or ribbon using the equation:

$$C_i = \frac{\Delta_i/L_i}{\max_i |\Delta_i/L_i|}$$

where $L_i$ is a length of the time section in minutes and $\Delta_i$ is a sum of a weighting cost ($\Omega$) and a difference between a market volume-weighted average price for the time section, where $$\Omega = s \times (P - P_i) \times (\rho V_i - v_i); \text{ where } \rho = \frac{v}{V} = \frac{\sum_i v_i}{V_i},$$

s=1 if the order is a sell order and s=−1 if the order is a buy order,
$v_i$=the volume of the order traded within the time section,
$p_i$=the average price achieved for the order within the time section,
$V_i$=the volume traded on the market within the time section, and
$P_i$=the volume-weighted average price within the time section.

12. The method of claim 11, wherein the information corresponding to the one or more user orders includes at least one of user order execution information for the one or more user orders, information corresponding to market order information, and information corresponding to market trade information.

13. The method of claim 11, wherein the plurality of time sections is divided based upon order events or changes in limit price of orders.

14. The method of claim 13, wherein corresponding data points in each of the one or more displayable portions are each displayed corresponding to a time bucket in a plurality of time buckets.

15. The method of claim 11, wherein the one or more displayable portions includes a first displayable portion, a second displayable portion, and a third displayable portion, wherein the first displayable portion is adapted to display first data relating to at least one of prices of the user orders, user order executions, market orders, and market trades within a first selected time period, wherein the second displayable portion is adapted to display second data relating to at least one of a volume of user orders filled and volume of user orders within a second selected time period, and wherein the third displayable portion is adapted to display third data relating to the order performance metrics relating to the performance of the user orders compared with market benchmarks for each of the plurality of time sections within a third selected time period.

16. The method of claim 15, wherein the third displayable portion is further adapted to display each of the order metrics as one or more bars or ribbons extending along a horizontal axis, each bar or ribbon being divided into segments, each segment corresponding to at least one of the plurality of time sections, and each segment having a color selected from a color gradient based on a user order's relative performance in comparison to a market benchmark for the time section corresponding to each segment and a color intensity ($C_i$) related to the length of said time section and a market value weighted average price for the time section.

17. The method of claim 16, wherein the color selected from the color gradient for each segment of the bar or ribbon corresponds to one of the difference between a market volume-weighted average price for each of the plurality of time sections and a volume-weighted average price of the user order executions for each of the plurality of time sections or the difference between an arrival price for a user order and a volume-weighted average price of the executed orders that take place during the time section corresponding to each segment.

18. The method of claim 17, wherein the first displayable portion of the display device is disposed in an upper portion thereof, the second displayable portion of the display device is disposed in a lower portion thereof, and the third displayable portion of the display device is disposed in a third portion thereof disposed between the first and second portions.

19. The method of claim 11, wherein the displaying further comprises:
 generating a graphical representation of an execution price for each user order execution as data points plotted with respect to time along a horizontal axis;
 generating a graphical representation of a market price based on the market order information as a line, plotted with respect to time along a horizontal axis;
 generating a graphical representation of a volume-weighted average price, displayed as a line, plotted with respect to time along a horizontal axis, starting from a time at which the user order is placed and extending to a displayed end time;
 generating a graphical representation of a limit price for each user order as a line, plotted with respect to time along a horizontal axis; and
 generating a graphical representation of an indicator, displayed as a shaded area, that is displayed in the event that market prices fall outside of the limit price of a user order, or in the event that there is insufficient market volume available to fill a user order.

20. A non-transitory computer-readable medium containing computer-executable instructions for performing a method for displaying order metrics, the method comprising:
 receiving and aggregating market data for one or more market instruments, including information corresponding to one or more user orders;
 calculating order metrics relating to the one or more user orders with respect to market benchmarks for each of a plurality of time sections; and
 generating a graphical representation of the order metrics;
 displaying, in one of one or more displayable portions of a display device, the graphical representation of the order metrics as one or more bars or ribbons, each of the one or more bars or ribbons extending horizontally within the respective one or more displayable portions;
 calculating a color intensity ($C_i$) for the display of a color of each segment of each bar or ribbon using the equation:

$$C_i = \frac{\Delta_i/L_i}{\max_i |\Delta_i/L_i|}$$

where $L_i$ is a length of the time section in minutes and $\Delta_i$ is a sum of the weighting cost ($\Omega$) and a difference between the market volume-weighted average price for the time section, where $$\Omega = s \times (P - P_i) \times (\rho V_i - v_i); \text{ where } \rho = \frac{v}{V} = \frac{\sum_i v_i}{V_i},$$

s=1 if the order is a sell order and s=−1 if the order is a buy order,
$v_i$=the volume of the order traded within the time section,
$p_i$=the average price achieved for the order within the time section,
$V_i$=the volume traded on the market within the time section, and
$P_i$=the volume-weighted average price within the time section.

* * * * *